Nov. 7, 1933.  H. J. B. SCHARNBERG  1,933,766
TURNPLATE FOR CANE SUGAR MILLS
Filed Jan. 9, 1930
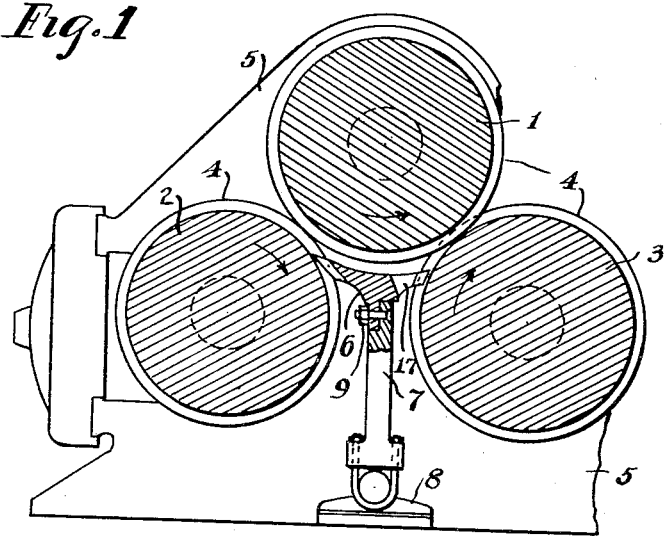
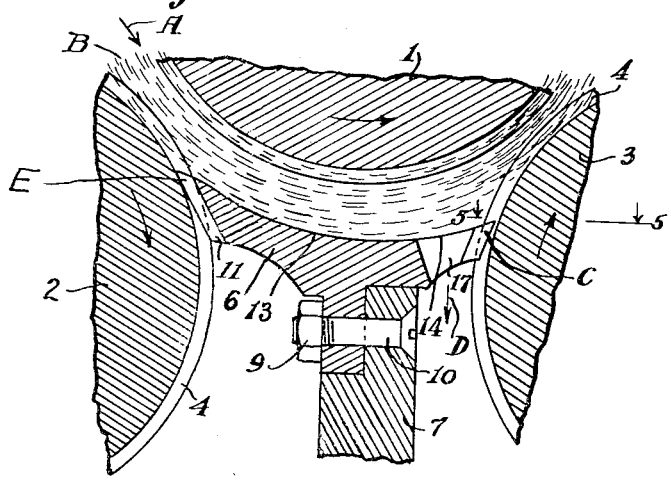
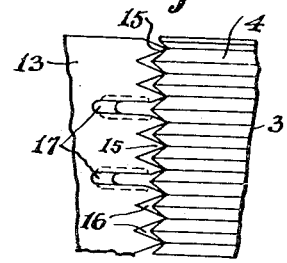
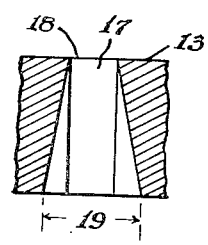
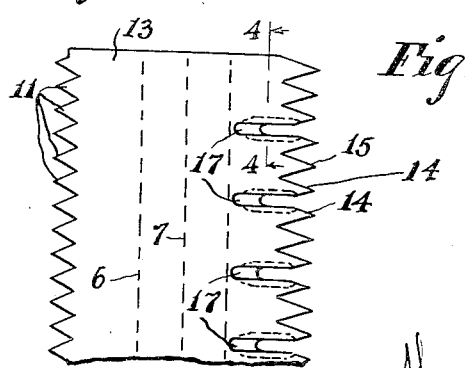
INVENTOR
Herman J.B.Scharnberg.
BY
Harold D. Penney
ATTORNEY Patented Nov. 7, 1933

1,933,766

UNITED STATES PATENT OFFICE 1,933,766

TURNPLATE FOR CANE SUGAR MILLS

Herman J. B. Scharnberg, Fort Wadsworth, Staten Island, N. Y.

Application January 9, 1930. Serial No. 419,714

18 Claims. (Cl. 100—47)

The present invention relates to an improvement in sugar cane milling apparatus and more especially to an improvement in the turn-plates therefor.

The main object of this improvement lies in the provision of means on a turn-plate, in addition to its normal bagasse turning function between the crusher rolls, whereby the expressed cane juice may readily escape to the juice pan below, and such juice will be freed of all particles of bagacille, which is a mass of small or fine fibre portions.

In present practice, the turn-plate permits the expressed juice to flow during the turning or leading of the bagasse through the crusher rolls, but at the same time a large amount of bagacille passes with the juice or falls down into the juice pan, due to the large clearances between the trailing edge of the turn-plate and the bagasse roll. This fault causes the expressed juice to become loaded with heavily juice-soaked bagacille which has to be removed and returned through the mill to express its rich juice content therefrom. Owing to the large volume of juice carried by this returned bagacille, the crusher rolls tend to slip which reduces the output and sometimes causes clogging and, in general, the capacity and efficiency of the mill are reduced.

To overcome this deficiency my new turn-plate is so constructed that the faults noted are corrected and the expressed cane juice is freely passed to the juice pan, free of bagacille; and pressed bagacille is, in addition, prevented from falling into the juice pan. Thus, in effect, the turn-plate functions also, substantially, as a juice strainer without interfering with the free flow of the juice away from the bagasse.

While not so limited, my present turn-plate may be, preferably, so constructed as to cooperate with the grooved crusher rolls such as are set forth in my copending United States Patent application Serial No. 391,072, filed September 7, 1929.

In the drawing:

Fig. 1 is a transverse sectional view of a characteristic crushing mill of the three-roll order, shown partly fragmented in order to better illustrate the turn-plate and support, also shown partly in section.

Fig. 2 is an enlarged fragmented view in similar section to that as described for Fig. 1, but showing only the crusher rolls and the turn-plate in enlarged section upon its support.

Fig. 3 is an enlarged fragmentary plan view of the turn-plate illustrating the novel features.

Fig. 4 is a fragmentary enlarged view of one of the juice canals of the turn plate, taken on the line 4—4, Fig. 3, looking in the direction of the arrows.

Fig. 5 is a more or less fragmentary view illustrating at one plane of contact, between the turn-plate and the roll 3, as taken on the line 5—5, Fig. 2, looking in the direction of the arrow to illustrate the cooperating strainer-like effect of the turn-plate and roll 3, at the point of contact.

The crusher, as best noted in Fig. 1, comprises an upper or floating roll 1, a cane roll 2 and a bagasse roll 3, all of which, as is customary in practice, are provided upon their cylindrical surfaces with a plurality of longitudinally upstanding ribs 4. The rollers are mounted in a frame work 5 and are driven to rotate in the direction of the arrows, as indicated upon each roll, by well understood means, not shown.

The turn-plate including a body 6, is mounted as shown upon the usual support 7, suitably mounted to the base of the frame work as at 8, said turn-plate being affixed to the said base by a rabbetted seat and held thereto by a plurality of nuts and bolts 9 and 10, one of which is shown in Fig. 2.

Fig. 1 is merely to illustrate the coacting features of the mill and turn-plate, which latter will now be described in detail.

With the crushing rolls 1, 2 and 3 in operative position, as illustrated, for instance, in Fig. 2, wherein only a fragment of the rolls is shown, the turn-plate is so constructed as to have, on its leading edge E, a plurality of V-shaped teeth 11 therein which are cut to a depth, angle and pitch whereby they may enter into and interfit with the V-grooves or cylindrical ribs 4 on the cane roll 2. At this point it is understood that the turn-plate cooperates to turn the bagasse B, Fig. 2, as it moves forwardly between the rolls, as indicated by the arrow A, Fig. 2.

The bagasse is caught by the front end of the turn-plate and is directed downwardly under the floating pressure roll 1, and again, due to the curved face 13 of the turn-plate, the bagasse is directed around the lower face of roll 1 and upwardly into and between the floating roll 1 and the bagasse roll 3, at which point the juice is expressed.

The rear or trailing face C of the turnplate 6 is also provided with teeth 14, 15 which are rearwardly inclined, as in Fig. 2, and enter into and cooperate with the spaces between the cylindrical V-shaped webs 4 on the roll 3. The teeth 14, 15 differ from the teeth 11, and this is for the purpose of cooperating with the teeth 4 of the roll 3 whereby to create a plurality of open angular interstices or recesses 16 between the longer and more acute angled teeth 15 on the trailing edge or face C and the shorter and less acute teeth 4 on the roll 3. The tops of the teeth 14, 15 engage the bottoms or roots of the teeth 4, while the tops of the latter teeth are spaced from the bottoms of the teeth 14, 15.

Thus, while the ends of the teeth 15 may rest solidly or in near proximity to the bottoms or roots of the V grooves in the roll 3 and provide a clear path for the redirection of the bagasse in between the bagasse roll 3 and the pressure roll 1, there are ample openings through the interstices 16 for the discharge therefrom of the wave of juice as it is forced backwardly by pressure between the rolls 1 and 3. The interstices 16 thus formed are of sufficient width and area to discharge a considerable amount of cane juice as it is expressed from the bagasse. As clearly shown in Fig. 2 (see also Fig. 3) the respective teeth 11, 14 and 15, are provided with extended top portions, which engage the roots of the teeth 4, and retracted top portions, which are spaced from said roots, so that the edges disposed between said respective extended and retracted portions are disposed in parallel relation. Said edges are inclined, as shown, and at least a portion thereof may engage said roots, even after considerable wear.

However, it has been found advisable to increase the juice discharge-port areas for taking away the juice as fast as it is expressed, and to this end an added plurality of juice discharge canals are provided in the turn-plate and these are fully shown in Figs. 2, 3 and 4. To this end the trailing edge C of the turn-plate has a plurality of slots 17 cut therein and so located that they are cut between the adjacent teeth 14 in said edge, Fig. 3, thereby causing an elongation of the V-shaped slot into a comparatively narrow, elongated open ended mouth. This construction permits of the carrying away of an excess of juice over that which would normally be handled by the juice interstices 16 and at the same time prevent the carrying away, with the juice, of bagacille, either through the interstices 16 or through the ports 17. At the same time the ports and interstices, while of sufficient width to permit the discharge of all expressed juice, are of such size as to prevent bagacille from directly dropping from the bagasse into the juice pan, as the juice is passed through the turn-plate.

In order to permit the juice to flow away freely, the juice canals 17 are tapered downwardly and outwardly from the top of the turn-plate so that the top or entrance dimensions of the canals 17, Fig. 4, are much narrower than the discharge end 19 at the bottom thereof.

The last statement also applies to the manner of disposing the teeth 14, 15 on the trailing face C of the turn-plate wherein, as is best indicated at C, Fig. 2, the trailing teeth are extended rearwardly and away from the roll 3, thus creating a greater juice drainage area below, or on the under side of the face plate. The bagacille is thus prevented from passing to the pan and is carried forwardly with the bagasse.

During the operation of the device, due to the pressure between the floating roll and the bagasse roll 3, the juice as expressed is pushed rearwardly through the oncoming bagasse and passes through the mass of bagasse immediately in front of the pressure point between said rolls and flows down to the juice-pan, not shown, through the plural juice canals formed by the interstices 16 and the juice canal slots 17. Thus, in effect, the rear face C of the turn-plate immediately in advance of the pressure point between the crusher rolls 1 and 2 not only directs the bagasse between said rolls with a slight upward turn, but also acts as a strainer for permitting the discharge of the cane juice downwardly, in the direction of the arrow D, Fig. 2; this strainer-like structure being best illustrated in Fig. 5.

Variations may be resorted to within the scope of the invention, and parts of the improvements may be used without others.

What I claim is:

1. A cane mill comprising in combination front and rear rolls having circumferential V-shaped ribs; a turn-plate including leading and trailing edges, said edges having V-shaped teeth the tops of which are aligned and adapted to engage the roots of the ribs of the respective rolls in cooperating relation; the teeth of said leading edge having their faces disposed at the same angle as that of the faces of the ribs of said front roll; and the teeth of said trailing edge having their faces disposed at an angle which differs from the angle of the faces of the ribs of said rear roll, whereby to provide juice discharge ports between the tops of the ribs of said rear roll and the roots of the associated teeth.

2. The combination with a crusher mill of the class described comprising ribbed crusher rolls, and a turn-plate therefor, said turn-plate having leading and trailing edges, teeth upon said edges interfitting with the ribs on said crusher rolls, said teeth being inclined away from said edges and rolls, and formed to create a juice passage between said teeth and ribs.

3. The combination with a crusher mill of the class described comprising a plurality of ribbed crusher rolls, and a turn-plate therebetween, said turn-plate having leading and trailing edges, teeth upon said edges interfitting with the ribs on said crusher rolls, said teeth being inclined away from said edges and rolls, the teeth on the trailing edge of said turn-plate being formed to create a juice passage between said teeth and ribs.

4. The combination with a crusher mill of the class described comprising a plurality of ribbed crusher rolls, a turn-plate therebetween, said turn-plate having opposed leading and trailing edges, teeth upon said edges interfitting with the ribs on said crusher rolls, said teeth being inclined away from said edges and rolls, the teeth on the trailing edge of said turn-plate being formed to create a juice passage between said teeth and ribs, and juice canals located between the teeth on said trailing edge.

5. The combination with a crusher mill of the class described comprising a plurality of opposed ribbed crusher rolls, a turn-plate therebetween, said turn-plate having opposed leading and trailing edges, teeth upon said edges interfitting with the ribs on said crusher rolls, said teeth being inclined away from said edges and rolls, the teeth on the trailing edge of said turn-plate being formed to create a juice passage between said teeth and ribs, and juice canals located on the trailing edge of said turn-plate, said canals being tapered from top to bottom.

6. The combination with a crusher mill of the class described comprising a plurality of opposed ribbed crusher rolls, a curved turn-plate therebetween, said turn-plate having opposed leading and trailing edges, teeth upon said edges interfitting with the ribs on said crusher rolls, said teeth being inclined away from said edges and rolls, the teeth on the trailing edge of said turn-plate being formed to create a juice passage between said teeth and ribs, and juice canals located between the teeth on the trailing edge of said turn-plate, said canals being tapered from top to bottom.

7. In a cane mill comprising crusher members which include a roll having circumferential V-shaped ribs, a turn-plate including V-shaped teeth having faces disposed at a more acute angle than that of the faces of said ribs, said teeth having their tops engaging the roots of said ribs, so that drainage recesses may be provided between the tops of said ribs and the roots of said teeth.

8. A cane mill including in combination with front and rear rolls having thereon V-shaped circumferential ribs, and a support; a turn-plate carried by said support and including front and rear V-shaped teeth having their tops disposed in the roots of said respective ribs, and juice discharge ports disposed in said turn-plate at the tops of the ribs of said rear roll, the faces of said rear teeth being more acute than the faces of the ribs of said rear roll.

9. A cane mill including in combination with front and rear rolls having thereon V-shaped ribs, and a support, a turn-plate carried by said support and including a front edge having V-shaped teeth cooperating with the ribs of said front roll, a rear edge including V-shaped teeth having their points disposed in the roots of the ribs of said rear roll, and narrow canals disposed in said turn-plate and opening at their rear ends opposite the tops of the last mentioned ribs to strain the cane juice.

10. A cane mill including in combination with front and rear rolls having thereon V-shaped ribs, and a support, a turn-plate carried by said support and including a front edge having teeth cooperating with the ribs of said front roll, a rear edge including V-shaped teeth having their points disposed in the roots of the ribs of said rear roll, said rear teeth having their faces disposed in spaced relation with the faces of the cooperating ribs to provide ports thereat, and narrow canals disposed in said turn-plate and communicating at their rear ends with said ports to strain the cane juice.

11. A cane mill including in combination with front and rear rolls having thereon V-shaped ribs, a crusher roll cooperating with said rear roll, and a support; a turn-plate carried by said support and including a front edge having teeth cooperating with the ribs of said front roll, a rear edge including V-shaped teeth having their points disposed in the roots of the ribs of said rear roll, said rear teeth having their faces disposed in spaced relation with the faces of the last mentioned ribs to provide ports thereat, and narrow canals disposed in said turn-plate and opening at their rear ends opposite the tops of the last mentioned ribs to strain the cane juice.

12. In a cane mill comprising a pair of crusher rolls having V-shaped circumferential ribs, and a support; a turn-plate carried by said support and having teeth cooperating with the ribs of one of said rolls to provide ports thereat, canals disposed in said plate and including narrow top openings which communicate with said ports to strain the cane juice, said canals having laterally expanded boundary wall portions below said openings, and downwardly and forwardly extending portions disposed between the first mentioned portions to direct the juice clear of said support.

13. In a cane mill comprising a roll having V-shaped ribs, a turn-plate including an edge having V-shaped teeth, said teeth including tops for engaging the roots of said ribs, faces inclined from said tops and disposed at an angle differing from the angle of the faces of said ribs to provide at the latter ports, adjacent parallel edges continuous with selected pairs of the first mentioned faces and extending into said body, and non-parallel surfaces extending downwardly from said edges whereby to provide drainage slots in said body.

14. In a cane mill comprising a roll having circumferential V-shape ribs, a turn-plate including an edge having V-shaped teeth, said teeth including tops for engaging the roots of said ribs, faces disposed between said tops and having a more acute angle than that of the faces of said ribs, and sloping edges continuous with said points and disposed therebelow, the lower portions of said edges being spaced from said roots whereby to engage the latter as said points become worn.

15. A cane mill comprising in combination crusher members including a roll having circumferential V-shaped ribs, a turn-plate including an edge portion having flat upper and lower surfaces, V-shaped teeth formed on said portion and cooperating with said ribs, said teeth including faces which are disposed at a more acute angle than that of the faces of said ribs, said teeth having their tops engaging the roots of said ribs, so that drainage recesses may be provided between the tops of said ribs and the roots of said teeth, and inclined edges coincident with the tops of said teeth and extending between said surfaces.

16. A cane mill comprising in combination crusher members which include a roll having circumferential V-shaped ribs, a turn-plate including an edge portion having curved upper and lower surfaces, V-shaped teeth formed on said portion and cooperating with said ribs, said teeth including faces which are disposed at a more acute angle than that of the faces of said ribs, and the tops of said teeth engaging the roots of said ribs, so that drainage recesses may be provided between the tops of said ribs and the roots of said teeth, and inclined edges coincident with the tops of said teeth and extending between said surfaces, the lower ends of said edges being spaced from the roots of said ribs whereby the latter may be constantly engaged by the top ends of said edges during wear thereof.

17. In a cane mill, in combination with a front roll, and a rear roll having circumferential V-shaped ribs, a turn-plate comprising a body having a front edge cooperating with said front roll, a rear edge including V-shaped teeth, said teeth having their faces disposed at a more acute angle than the faces of said ribs whereby to form recesses at the tops of said ribs, the tops of said teeth being engaged against the roots of said ribs, a pair of adjacent parallel edges continuous with two of the first mentioned faces and extending into said body, and non-parallel surfaces extending downwardly from said edges to provide a drainage slot, said slot being in communication with one of said recesses.

18. A cane mill including in combination front and rear rolls having circumferential V-shaped ribs; a turn-plate comprising a body including a front edge having teeth cooperating with the ribs of said front roll; a rear edge including V-shaped teeth having their tops engaging the roots of the ribs of said rear roll, said teeth having their faces disposed at a more acute angle than the faces of said ribs to provide recesses thereat, spaced adjoining edges continuous with certain of the first mentioned faces and extending into said body, and surfaces extending downwardly from said edges and providing drainage slots, said slots being in communication with said recesses.

HERMAN J. B. SCHARNBERG.